(12) United States Patent
Kemp

(10) Patent No.: US 7,072,884 B2
(45) Date of Patent: Jul. 4, 2006

(54) COMPUTER SYSTEM AND METHOD OF DISPLAYING PRODUCT SEARCH RESULTS

(75) Inventor: Matthew Jon Kemp, Bartlett, IL (US)

(73) Assignee: Sears, Roebuck and Co., Hoffman Estates, IL (US)

( * ) Notice: Subject to any disclaimer, the term of this patent is extended or adjusted under 35 U.S.C. 154(b) by 367 days.

(21) Appl. No.: 10/278,343

(22) Filed: Oct. 23, 2002

(65) Prior Publication Data

US 2004/0083203 A1  Apr. 29, 2004

(51) Int. Cl.
G06F 17/30 (2006.01)

(52) U.S. Cl. ............................................. 707/3

(58) Field of Classification Search .............. 707/1–10; 705/26–27
See application file for complete search history.

(56) References Cited

U.S. PATENT DOCUMENTS

| | | | |
|---|---|---|---|
| 5,897,639 A | 4/1999 | Greef et al. | |
| 6,014,639 A | 1/2000 | Fohn et al. | |
| 6,035,283 A | 3/2000 | Rofrano | |
| 6,070,149 A | 5/2000 | Tavor et al. | |
| 6,169,986 B1 | 1/2001 | Bowman et al. | |
| 6,748,376 B1* | 6/2004 | Beall et al. | 707/3 |
| 2001/0044758 A1* | 11/2001 | Talib et al. | 705/27 |
| 2001/0049653 A1 | 12/2001 | Sheets | |
| 2002/0004764 A1 | 1/2002 | Stolze et al. | |
| 2002/0013778 A1 | 1/2002 | Neal et al. | |
| 2002/0029168 A1 | 3/2002 | McConnell, Jr. et al. | |
| 2002/0077921 A1 | 6/2002 | Morrison et al. | |
| 2002/0082932 A1 | 6/2002 | Chinnappan et al. | |
| 2002/0087408 A1 | 7/2002 | Burnett | |
| 2002/0087432 A1 | 7/2002 | Muniz | |
| 2003/0033227 A1* | 2/2003 | Heiser | 705/35 |

* cited by examiner

Primary Examiner—Jean M. Corrielus
Assistant Examiner—Joon Hwan Hwang
(74) Attorney, Agent, or Firm—Gary R. Jarosik

(57) ABSTRACT

The present invention provides a method of displaying product search results, a software program for displaying product search results, and a computer system for use in marketing products.

8 Claims, 6 Drawing Sheets

COMPUTER SYSTEM AND METHOD OF DISPLAYING PRODUCT SEARCH RESULTS

FIELD OF THE INVENTION

The present invention relates to a computer system and a method of displaying product search results on the computer system based on selected search criteria, and more particularly to a method of displaying product search results when no products satisfy the selected search criteria.

BACKGROUND OF THE INVENTION

The Internet is a network of interlinked computers that users access using a personal computer linked to an Internet browser. Websites may include hyperlinks that allow the user to jump from web page to web page and website to website. Hyperlinks are typically identified or highlighted on the web page to indicate that it can access additional information, whether from another web page or another website.

Many merchants have their own e-commerce website to advertise, market, and sell their products and/or services. The website may include product information (e.g., brand, size, color, etc.), prices, availability, and product specifications. Due to a plethora of information, websites may include a search engine for the user to easily navigate and locate a particular product and/or product information they desire. The search engine allows the user to select choices from predefined criteria. The user may select a choice from many different criteria, such as brand, color, size, etc.

SUMMARY OF THE INVENTION

After the user enters all selections, the computer system searches for products that satisfy the selected criteria. Typically, if there are no products that satisfy the selected criteria, the computer may provide a null results message to indicate that there are no products to display or no products meet the search criteria, or a similar message. This method of communicating to the user that there is a lack of search results to display is cumbersome and time consuming to the user because he or she must begin a new search with different selected criteria. The new selected search criteria may also not satisfy any of the products being searched, and again a null results message is presented to the user. The user may continue selecting different search criteria with the hope of eventually receiving a product search result. Alternatively, the user may go to a different website and patronize a competitor that may have a more user-friendly search engine. This results in a loss of sales opportunities and lost profits.

Therefore, it is desirable to provide an efficient and user-friendly computerized search engine and method of displaying product search results.

The present invention provides a method of displaying product search results, a software program for displaying product search results, and a computer system for use in marketing products. In particular, the method of displaying product search results comprises selecting search criteria for a product and searching a database for the product using the search criteria. If at least one product satisfies the search criteria, the method includes the act of displaying a hyperlink on the screen to access information about the product. If at least one product does not satisfy the search criteria, the method includes the act of displaying the search criteria and the number of corresponding products that satisfy each of the search criterion, and the act of displaying a hyperlink to access information about the corresponding products.

In another embodiment, the invention provides a method of displaying product search results comprising selecting search criteria for a product and searching a database for the product using the search criteria. If at least one product satisfies the search criteria, the method includes the act of displaying a hyperlink on the screen to access information about the product. If at least one product does not satisfy the search criteria, the method includes the act of displaying the search criteria and the number of corresponding products that satisfy each of the search criterion, and the act of displaying a hyperlink to access information about the corresponding products. The act of displaying includes the act of displaying the search criteria in an order in which it was selected, and the act of displaying the number of corresponding products that satisfy each of the search criterion includes the act of displaying the number of corresponding products for each search criterion where the number of products is a subset of each previous search criterion based on the order selected.

In another embodiment, the invention provides a software program for displaying product search results on a computer. The software program comprises a program module generating a user interface for entering search criteria and a program module for searching a product database using the search criteria and displaying a hyperlink on the computer to access information about a product if that product satisfies the search criteria. If at least one product does not satisfy the search criteria, then the software program displays on the screen the search criteria, the number of corresponding products that satisfy each of the search criterion, and a hyperlink to access information about the corresponding products.

In another embodiment, the invention provides a computer system for use in marketing products to prospective purchasers. The computer system comprises a server, and a software program operating on the server. The software program includes a program module generating a user interface for entering search criteria and a program module for searching a product database using the search criteria and displaying a hyperlink on the computer to access information about a product if that product satisfies the search criteria. If at least one product does not satisfy the search criteria, then the software program displays on the screen the search criteria, the number of corresponding products that satisfy each of the search criterion, and a hyperlink to access information about the corresponding products.

In another embodiment, the invention provides a computer system for use in marketing products to prospective purchasers. The computer system comprises a server, a display device connected to the server, and a product database accessible through the server. The computer system also includes means for searching a product database using search criteria and displaying a hyperlink on the computer to access information about a product if that product satisfies the search criteria. If at least one product does not satisfy the search criteria, then the computer system displays the search criteria, the number of corresponding products that satisfy each of the search criterion, and a hyperlink to access information about the corresponding products.

In another embodiment, the invention provides a graphical user interface, generated on a website in response to a search on the web page wherein there are no subjects satisfying the search criterion. The graphical user interface comprises the search criteria used in the search, the number of subjects that satisfy each of the search criterion, and a hyperlink to access information about the subjects.

DETAILED DESCRIPTION OF THE PREFERRED EMBODIMENTS

Figure 1:
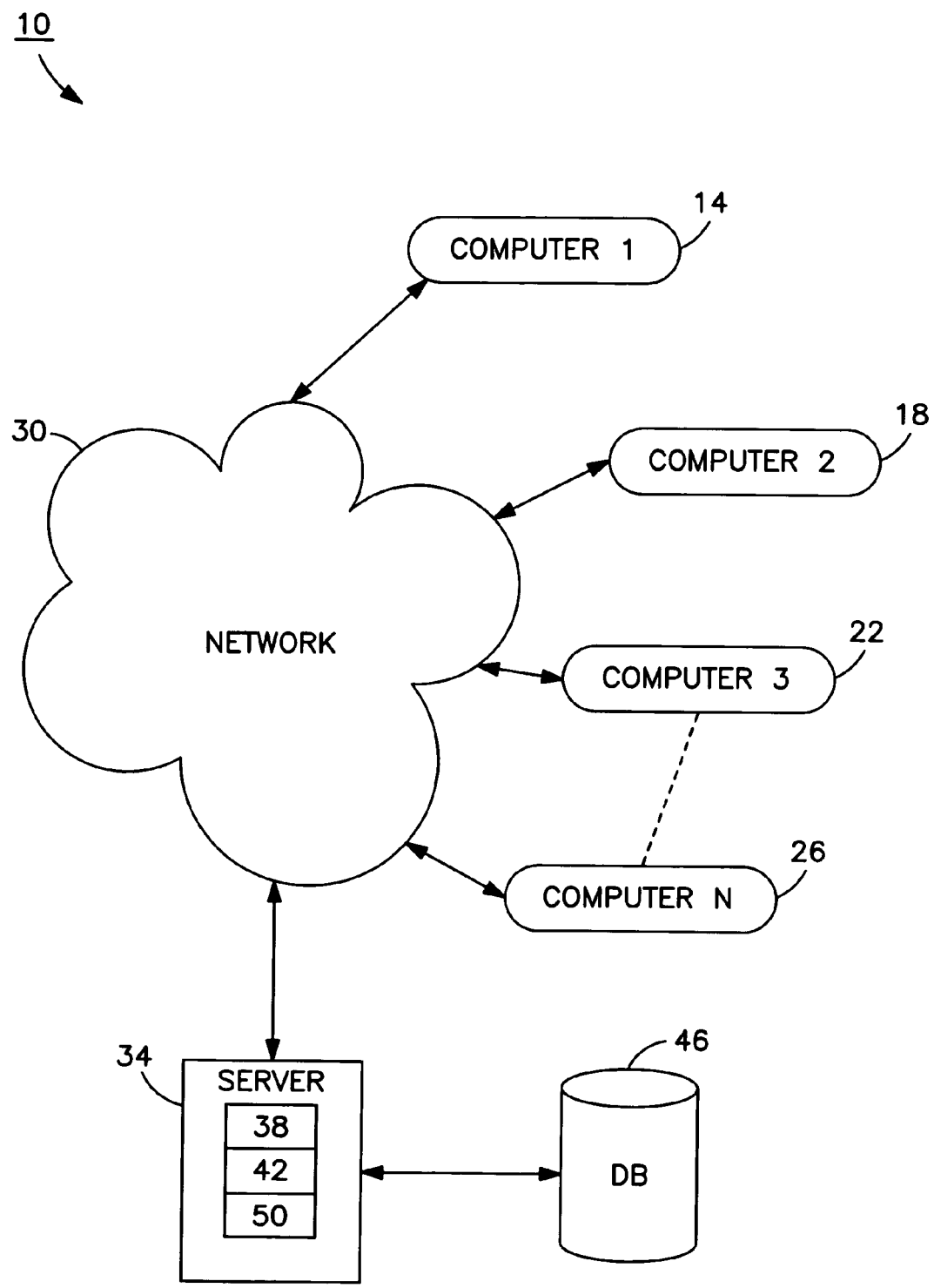
FIG. 1 is a schematic representation of a computer system embodying the invention.

Before embodiments of the invention are explained in detail, it is to be understood that the invention is not limited in its application to the details of the construction and the arrangements of the components set forth in the following description or illustrated in the drawings. The invention is capable of other embodiments and of being practiced or being carried out in various ways. Also, the phraseology and terminology used herein is for the purpose of description and should not be regarded as limiting. The use of "including" and "comprising" and variations thereof herein is meant to encompass the items listed thereafter and equivalents thereof as well as additional items.

FIG. 1 schematically illustrates a network-based computer system 10 embodying the invention. Other embodiments that include fewer or more terminals or components than are shown in FIG. 1 are also encompassed by the invention. FIG. 1 illustrates a network-based system 10. The system 10 includes a plurality of computer terminals 14, 18, 22, and 26. The system 10 may include more or fewer computer terminals than illustrated. Terminals 14–26 may be desktop computers, laptop computers, hand-held computing devices, wireless devices, phones, Internet appliances, and similar devices capable of communications over a network 30. The terminals 14–26 may include standard input and output devices such as a mouse, keyboard, modem, microphone, printer, magnetic and optical storing devices, and a display. Of course, the terminals 14–26 could include a host of other technologically advanced input and output devices such as voice recognition devices, biometric devices, etc. The terminals 14–26 may include an operating system, a browser, and a communication application for communicating with a server 34 and each of the other terminals 14–26 via the network 30. Preferably, the browser is a web-based browser, such as a Microsoft Explorer browser or a Netscape Communicator browser.

Network 30 may be built according to any networking technology or topology or combinations of technologies and topologies and may include multiple sub-networks. Connections between the terminals 14–26 may be made through local area networks ("LANs"), wide area networks ("WANs"), public switched telephone networks ("PSTNs"), Intranets, the Internet, and other networks using either ground-based communication lines, or satellite or other wireless technologies.

The two-way arrows in FIG. 1 represent the two-way communication and information transfer between the network 30, the server 34, and the terminals 14–26.

The server 34 includes an operating system 38 and a communication application 42, accessible by the terminals 14–26. The server 34 is also coupled to one or more databases 46.

An Internet/Intranet website 50 is created on the server 34 that can be browsed, surfed, and searched for information on products, services, businesses, etc. using a web browser. The server 34 may host many different websites and web pages. The server 34 may also connect to other servers (not shown) and networks (not shown) throughout the world. This interconnection between servers and networks make up the Internet.

The terms "screen" and "page" refer to any grouping or association of data regardless of the presentation formatting or programming used to create the grouping or association. As such, all of the websites, web pages, and screens of system 10 are not limited to the arrangement as shown in any of the drawings. The screens may include, but are not limited to fields, dialog boxes, tabs, buttons, radio buttons, and drop down menus. Field titles may vary and are not limited to that shown in the drawings. The website 50 may provide access to additional information, web pages, and websites other than those shown in FIGS. 2–5. Each website and web page is accessible by activating or clicking on an icon or hypertext link with a computer mouse, keyboard, or similar input device.

The website 50 is accessible by any of the terminals 14–26. The website 50 includes a number of web pages and other content including a search web page 54. An exemplary search web page 54 is illustrated, in parts, in FIGS. 2 and 3. The web page 54 includes an entity name 58, such as the name of a store (e.g., Sears), a business, an organization, etc., a category name 62, such as a group of products (e.g., appliances), a keyword or item number search option 66 to search the website 50 for a particular item.

The web page 54 may also include several hypertext links (e.g., Auctions on eBay, Hot Buys, Shop by Brands, Clearance Center, Gift Registry, and Gifts) to other web pages (not shown) within the website 50 or other websites. The hypertext links are provided to access web pages containing additional information by clicking on the associated hypertext link with a mouse, keyboard, or similar input device.

The web page 54 includes a search information area 70. The search information area 70 includes information specific to a search category 74 (e.g., Cooking: Slide-In Ranges), the number 78 of items or products (e.g., 149 Slide-In Ranges exist in this category) that fall within the specific search category 74, and instructions 82 for searching for the products (e.g., Slide-In Ranges). The user may wish to view all of the products in this category 74, which may be done by selecting a hyperlink 86 (e.g., Find Matching Products).

In most cases, a user will want to narrow a product search by focusing on certain important characteristics, features or criteria of the product. The web page 54 allows a user to select from various criteria that apply specifically to the specific search category 74.

Figure 2:
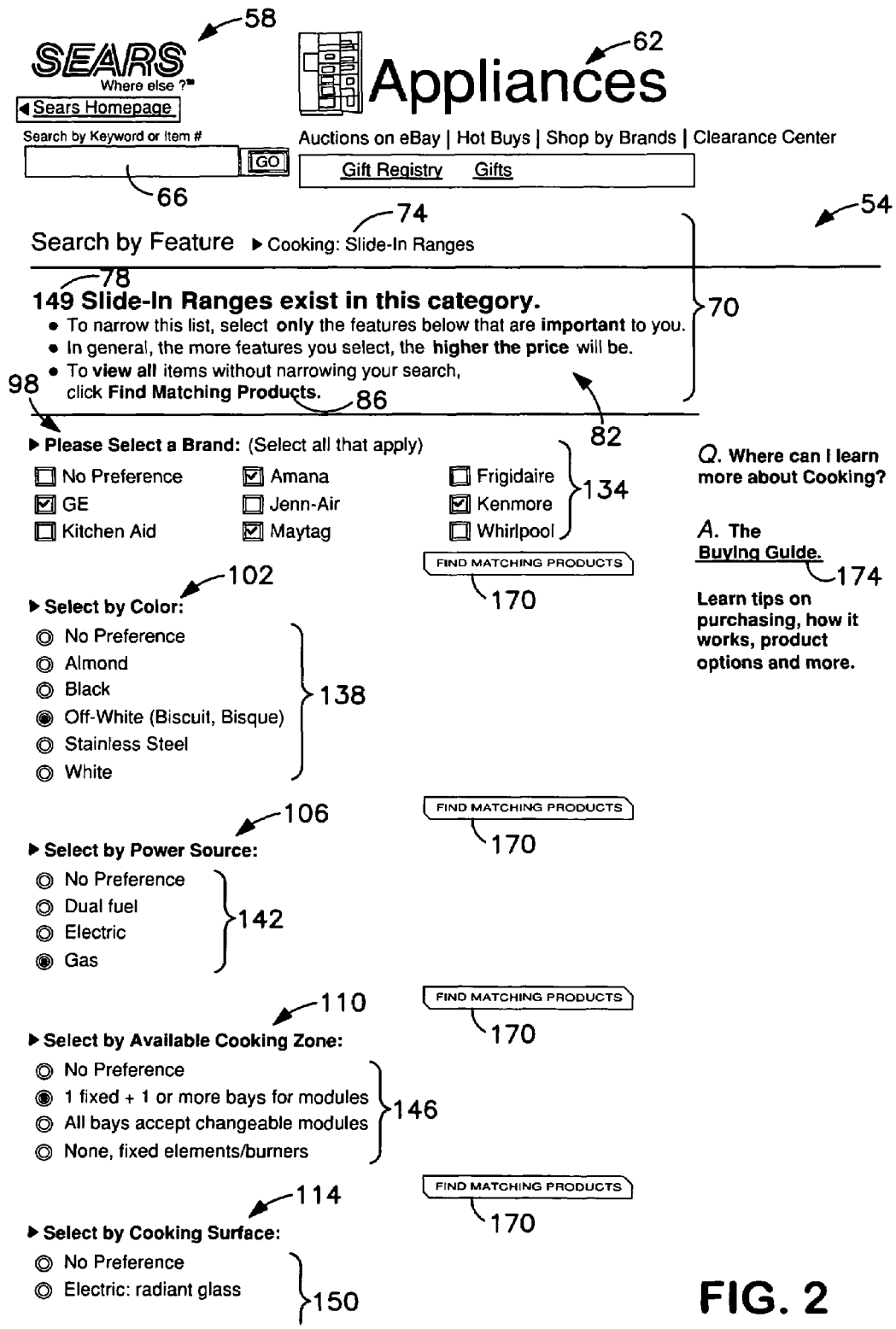
FIGS. 2 and 3 illustrate, in parts, a feature search web page generated by the software program.
Figure 3:
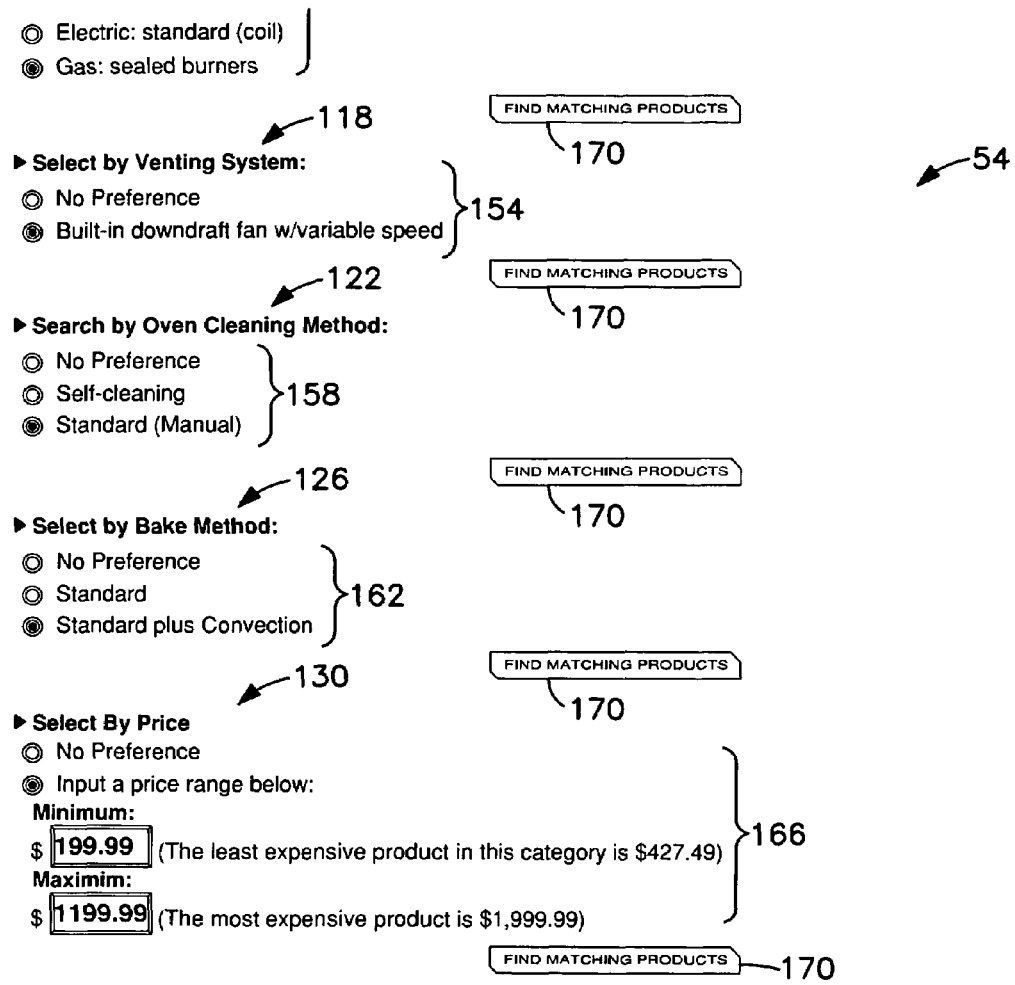
Figure 4:
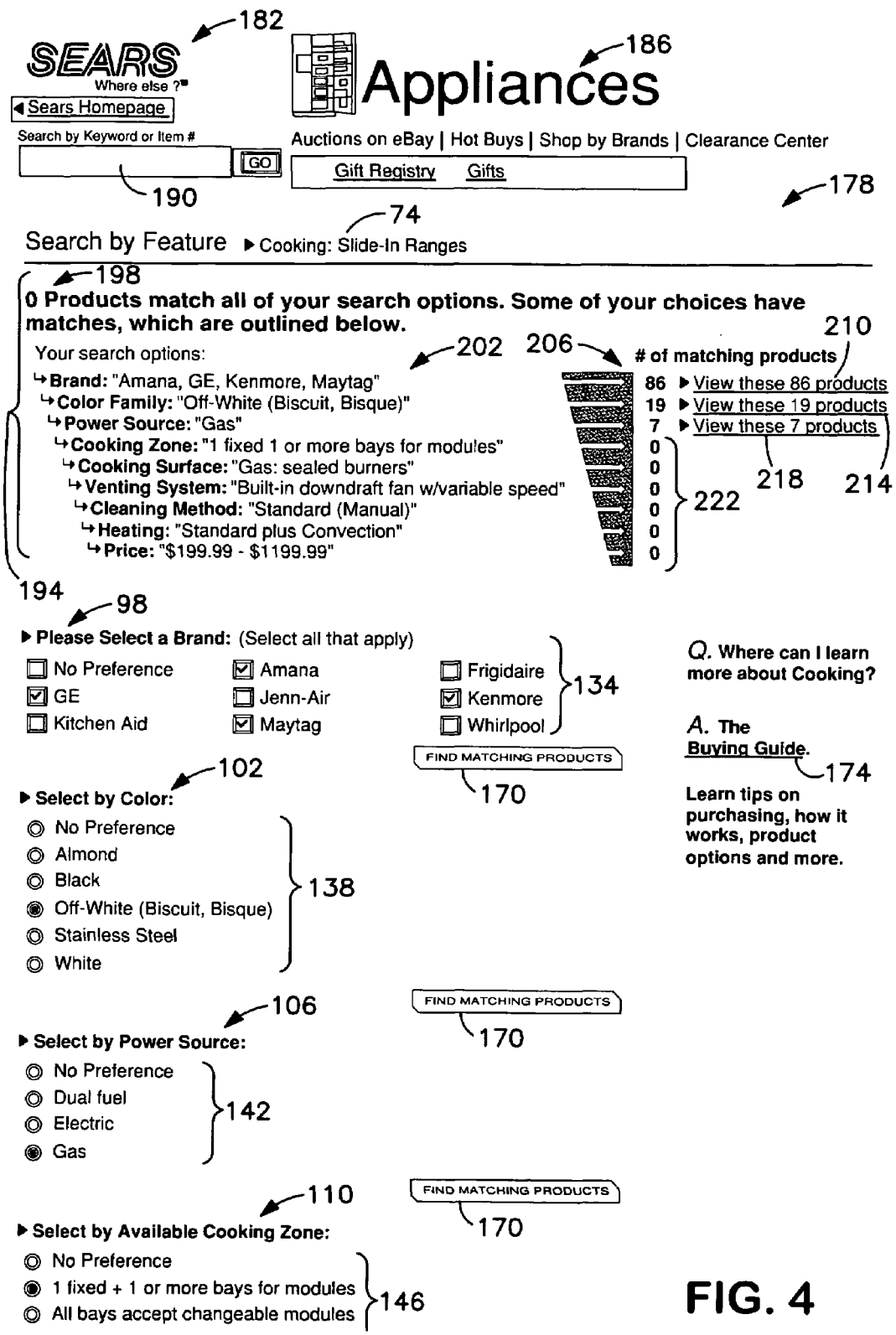
FIGS. 4 and 5 illustrate, in parts, a null results web page generated by the software program.
Figure 5:
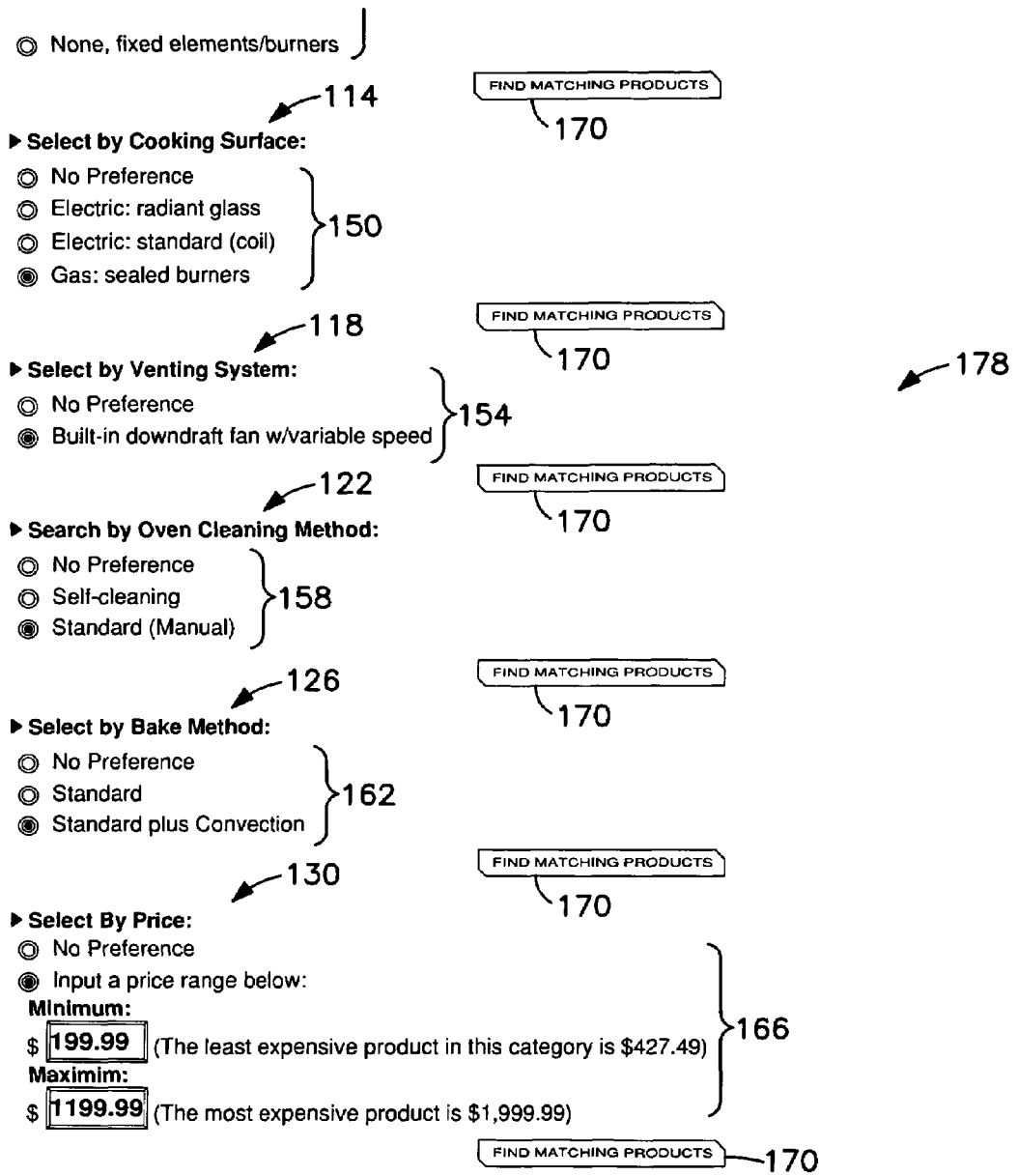

FIGS. 2 and 3 further illustrate, in parts, an interactive feature search web page 54 of the system 10. The web page 54 includes search criterion 98–130 and corresponding criterion selections 134–166, respectively. The user selects the desired characteristics or features of the product from the criterion selections 134–166. The user may select only one or several features from the criterion selections 134–166. After selecting the desirable features, the user selects a hyperlink 170 to transmit the search request for the product(s) that satisfy the selected criteria 134–166 to the server 34 through the network 30.

The web page 54 may also include a hyperlink 174 (e.g., buying guide) where a user can obtain additional information, such as purchasing tips, energy usage, how products work, maintenance and cleaning tips, protection agreements, safety, product disposal, glossary, and placing and checking status of orders.

Once the server 34 receives the search request, the search begins, and the computer server 34 searches the database 46 for products that satisfy all of the selected criteria. The computer server 34 transmits the search results information back to the computer terminal 14–26 to be displayed. The search of the database 46 may have found at least one product that satisfies the selected criteria. If at least one product satisfies the selected criteria, the product and associated web page (not shown) will be displayed on the display of the computer terminal 14–26. This web page provides product information, such as price, brand, size, availability, picture, and other characteristics of the product.

If there are no products that satisfy the selected criteria found in the database 46, a search results web page 178 (FIGS. 4 and 5) is displayed on the computer terminal 14–26. An exemplary search results web page 178 is illustrated, in parts, in FIGS. 4 and 5. The web page 178 includes an entity name 182, a category name 186, and a keyword or item number search option 190 to search the website 50 for a particular item. The entity name 182, category name 186, and search option 190 are similar to corresponding items 58, 62, and 66 on web page 54.

The web page 178 may also include several hypertext links (e.g., Auctions on eBay, Hot Buys, Shop by Brands, Clearance Center, Gift Registry, and Gifts) to other web pages (not shown) within the website 50 or other websites. The hypertext links are provided to access web pages containing additional information by clicking on the hypertext link with a mouse, keyboard, or similar device.

The web page 178 includes the specific search category 74 from web page 54. The web page 178 also includes a search results area 194. The search results area 194 provides to the user information relating to the number of products 198 that satisfy the selected criteria 134–166 (e.g., 0 products match all of your search options), a list 202 of the selected criteria from web page 54, the number of matching products 206 that satisfy each of the selected criterion, and hyperlink 210–218 to the matching products within each selected criterion. The search results area 194 also provides a null indicator 222 when there are no products that satisfy a selected criterion.

The web page 178 also includes the criterion 98–130 and the corresponding criterion selections 134–166, respectively. The criterion selections 134–166 indicate the selection made by the user, such that the user can make changes to the search based on the information provided in the search results area 194. After the user makes changes to the criterion selections 134–166, a new search is commenced by selecting the hyperlink 170.

In another embodiment of the invention, the web page 178 provides a list 202 of the selected criteria from web page 54 based on the order in which the criteria was selected. The web page 178 also provides the number of matching products 206 that satisfy each of the selected criterion, where the number of matching products is a subset of each previous search criterion in the order. For example, the seven matching products listed across from the third selected criterion, Power Source: "Gas," also satisfy the previous selected criteria for Brand and Color Family. The web page 178 also provides a hyperlink 210–218 to the matching products within each selected criterion. The search results area 194 also provides a null indicator 222 when there are no products that satisfy a selected criterion including all of the previous selected criterion based on the order.

In another embodiment of the invention, the web pages 54 and 178 operate based on a set of software commands or software programs stored in computer memory. The software program controls the computer terminal 14–26 to display the web pages 54 and 178 in the form of visual graphics. The visual graphics that appear on the computer display make-up the web pages 54 and 178 and form a graphical user interface that assist the user in operating the software program on the computer. The graphical user interface allows the user to manipulate the software program and the computer and navigate through a plethora of information. The graphical user interface, as illustrated in FIGS. 2–5, assists a user in navigating the Internet, selecting search criteria, and searching for products at a website of a particular merchant 58.

Figure 6:
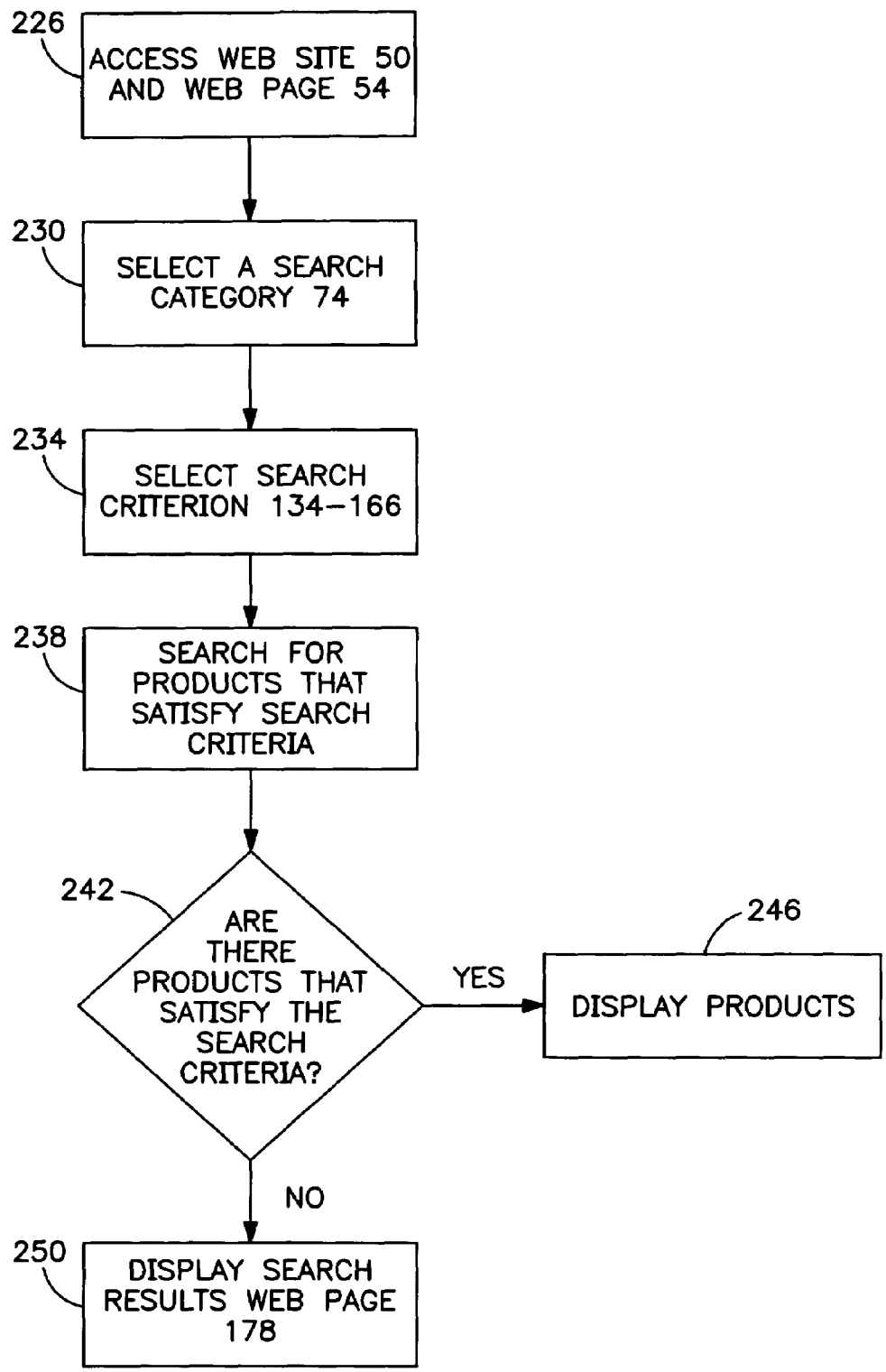
FIG. 6 illustrates a flow chart of the method of displaying product search results.

A method of displaying product search results is illustrated in a flow chart of FIG. 6. At act 226, a user accesses a computer terminal 14–26 to access the website 50 and web page 54. After reaching the web page 54, the user selects a specific search category 74, i.e., washers, dryers, dishwashers, stoves, humidifiers, fans, etc., at act 230. The specific search category 74 is subcategorized into various criteria from which the user can select search criteria 134–166 at act 234. At act 238, after selecting the desired search criteria, the user selects a search button (e.g., hyperlink 170) to transmit the search request to the server 34 to search for the products that satisfy the selected criteria.

At act 242, the server 34 determines whether there are products that satisfy the selected criteria. If there are products that satisfy the selected criteria, the server 34 transmits the product information to the computer terminal 14–26 for display at act 246. If there are no products that satisfy the selected criteria, the server 34 transmits the search results web page 178 at act 250.

As can be seen from the above description and drawings, the invention provides computer systems and methods of displaying product search results. Various features and advantages are set forth in the following claims.

What is claimed is:

1. A method of providing to a client computer product search results from a server computer in communication with the client computer, the method comprising:

receiving at the server computer from the client computer a search request specifying a plurality of search parameters;

determining at the server computer if one or more products in a database satisfy all of the plurality of search parameters;

if one or more products in the database satisfy all of the plurality of search parameters, providing from the server computer to the client computer a hyperlink used to access information about the one or more products in the database satisfying all of the plurality of search parameters;

if no products in the database satisfy all of the plurality of the search parameters, for each of one or more of the plurality of search parameters:

providing from the server computer to the client computer for display on the client computer a number of products in the database satisfying at least the search parameter; and when one or more products in the database satisfy at least the search parameter, providing from the server computer to the client computer a hyperlink used to access information about the one or more products in the database satisfying at least the search parameter; and using an order in which the plurality of search parameters were specified in the search request when determining if one or more products in the database satisfy all of the plurality of search parameters, wherein the steps of providing a number of products in the database satisfying at least the search parameter and providing a hyperlink used to access information about the one or more products in the database satisfying at least the search parameter are performed using combinations of the plurality of search parameters formed using the order in which the plurality of search parameters were specified in the search request, and wherein the combinations of the plurality of search parameters are formed by successively adding each of the plurality of search parameters following the order in which the plurality of search parameters were specified in the search request.

2. The method of claim 1, wherein the plurality of search parameters are selected from one or more categories.

3. The method of claim 2, wherein the categories include at least one selected from a group consisting of a brand, a size, and a color.

4. A method of providing to a client computer product search results from a server computer in communication with the client computer, the method comprising:

receiving at the server computer from the client computer a search request specifying a plurality of search parameters;

determining at the server computer if one or more products in a database satisfy all of the plurality of search parameters;

if one or more products in the database satisfy all of the plurality of search parameters, providing from the server computer to the client computer a hyperlink used to access information about the one or more products in the database satisfying all of the plurality of search parameters; and if no products in the database satisfy all of the plurality of the search parameters, for each of the plurality of search parameters:

providing from the server computer to the client computer for display on the client computer a number of products in the database that satisfy the search parameter and each search parameter preceding the search parameter in an order in which the plurality of search parameters were specified in the search request; and when one or more products in the database satisfy the search parameter and each search parameter preceding the search parameter in the order in which the plurality of search parameters were specified in the search request, providing from the server computer to the client computer a hyperlink used to access information about the one or more products in the database satisfying the search parameter and any search parameters preceding the search parameter in the order in which the plurality of search parameters were specified in the search request.

5. A computer-readable media having computer executable instructions for providing product search results on a computer, the instructions performing steps comprising:

receiving a search request specifying a plurality of search parameters;

determining if one or more products in a database satisfy all of the plurality of search parameters;

if one or more products in the database satisfy all of the plurality of search parameters, providing a hyperlink used to access information about the one or more products in the database satisfying all of the plurality of search parameters;

if no products in the database satisfy all of the plurality of the search parameters, for each of one or more of the plurality of search parameters:

displaying a number of products in the database satisfying at least the search parameter; and when one or more products in the database satisfy at least the search parameter, providing a hyperlink used to access information about the one or more products in the database satisfying at least the search parameter; and using an order in which the plurality of search parameters were specified in the search request when determining if one or more products in the database satisfy all of the plurality of search parameters, wherein the steps of displaying a number of products in the database satisfying at least the search parameter and providing a hyperlink used to access information about the one or more products in the database satisfying at least the search parameter are performed using combinations of the plurality of search parameters formed using the order in which the plurality of search parameters were specified in the search request, and wherein the combinations of the plurality of search parameters are formed by successively adding each of the plurality of search parameters following the order in which the plurality of search parameters were specified in the search request.

6. The computer-readable media of claim 5, wherein the plurality of search parameters are selected from one or more categories.

7. The computer-readable media of claim 6, wherein the categories include at least one selected from a group consisting of a brand, a size, and a color.

8. A computer-readable media having computer executable instructions for providing product search results on a computer, the instructions performing steps comprising:

receiving a search request specifying a plurality of search parameters;

determining if one or more products in a database satisfy all of the plurality of search parameters;

if one or more products in the database satisfy all of the plurality of search parameters, providing a hyperlink used to access information about the one or more products in the database that satisfy all of the plurality of search parameters; and if no products in the database satisfy all of the plurality of the search parameters, for each of the plurality of search parameters:

displaying a number of products in the database satisfying the search parameter and each search parameter preceding the search parameter in an order in which the plurality of search parameters were specified in the search request; and when one or more products in the database satisfy the search parameter and each search parameter preceding the search parameter in the order in which the plurality of search parameters were specified in the search request, providing a hyperlink used to access information about the one or more products in the database satisfying the search parameter and any search parameters preceding the search parameter in the order in which the plurality of search parameters were specified in the search request.

* * * * *